June 6, 1944.   R. R. PITTMAN   2,350,637
TEMPERATURE INDICATOR
Filed April 4, 1942
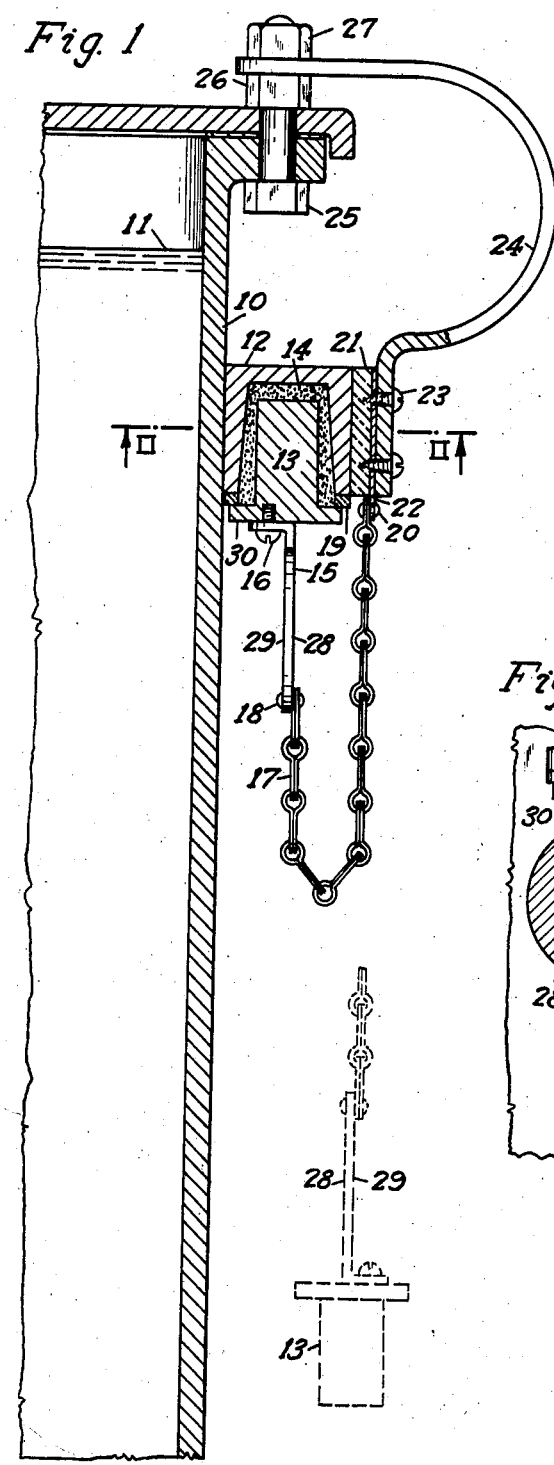
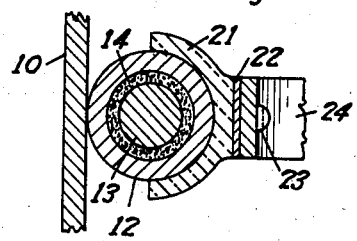
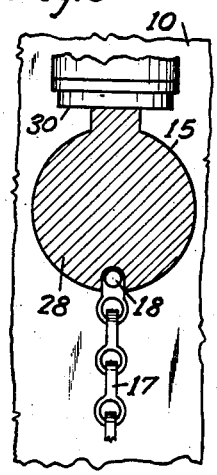
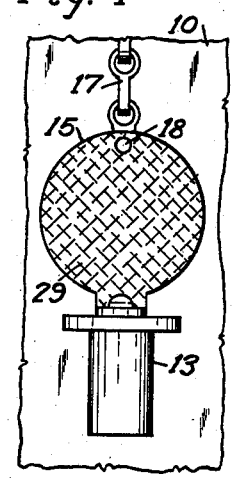
INVENTOR
Ralph R Pittman Patented June 6, 1944

2,350,637

UNITED STATES PATENT OFFICE 2,350,637

TEMPERATURE INDICATOR

Ralph R. Pittman, Pine Bluff, Ark.

Application April 4, 1942, Serial No. 437,629

3 Claims. (Cl. 116—114.5)

This invention relates to thermally responsive devices commonly employed for indicating when an associated body has attained a predetermined temperature.

Among the objects of the invention may be noted the provision of an indicating means movable from a normal to a suspended and stable indicating position in response to the melting of normally frozen material arranged to normally restrain the movement of the indicating means, together with means for initially guiding and finally holding the indicator in the indicating position; the provision of an indicator responsive within a temperature range of more than 50 degrees C. and less than 100 degrees C. which embodies as a temperature responsive element a normally crystalline organic compound which without softening will at a predetermined temperature change from a solid to a liquid state; and means for joining together only through frictional engagement with the temperature responsive material two separable members of relatively high heat conductivity material which are so constructed and arranged that, upon melting of the frozen material disposed therebetween, one of the members moves away from the other without freezing in an intermediate position between the normal and the indicating position. Other objects will be in part obvious, and in part pointed out hereinafter.

The invention comprises the elements and combinations thereof, features of construction and arrangement of parts to be exemplified in the description to follow, and the scope of the invention will be indicated in the accompanying claims.

In the drawing: Fig. 1 is a side elevational view of the device, shown partly in section; Fig. 2 is a section along the line 2—2 of Fig. 1; and Figs. 3 and 4 are respectively fragmentary front views of the indicator in the normal position and in the indicating position. Similar reference characters indicate corresponding parts in the several figures of the drawing.

The present invention is particularly adapted for indicating the tank wall temperature of electric transformers such as are commonly installed overhead on poles of electric distribution systems. To be suitable for such application, three important considerations are first, visibility in the indicating position at considerable distance, second, critical and definite operation immediately upon attainment of the temperature at which operation is desired, which is in the band of 50–100 degrees C., and third, a simple, rugged and inexpensive article.

The manner in which my invention meets the previously stated requirements of visibility, critical operation, and simplicity will be clear from the following description.

Referring first to Figs. 1 and 2 of the drawing, the numeral 10 indicates a portion of a wall of a tank, such as that which may form the container for a transformer winding (not shown), in which is indicated a cooling and insulating liquid 11. The cover fastening bolt 25, together with the nuts 26 and 27, may provide means for rigidly attaching at its upper end the outwardly and downwardly and thence inwardly extending resilient metal indicator support 24, to the lower end of which is secured, by the screws 23, the housing of insulating material 21.

The support 24 preferably extends downwardly from the top of the container 10 to a point below the level of the liquid 11, and an inverted, preferably metal, cup 12 is positioned in the housing 21 and so arranged that the cup 12 abuts the tank wall 10, and is continually urged to abutment by the resilient member 24. The hollow of the cup, for reasons which will later appear, is preferably, but not necessarily uniformly tapered from the open end.

A separably movable member 13 is arranged in spaced nested relationship with the cup 12, extending coaxially upward from the lower and open end to a point near the closed end thereof, and the space between the inner surface of the cup 12 and the outer surface of the inwardly extending portion of the member 13 is filled with a fusible crystalline anhydrous organic insulating material 14, which may be nitronaphthalene alpha. At its lower end and outside of the cup 12, the member 13 is provided with the outwardly extending horizontally positioned peripheral flange 30, and a ring gasket of resilient heat-insulating material 19 positioned between the lower end of the cup 12 and the shoulder 30 of the member 13. In assembling this portion of the indicator, the cup 12 may be inverted, the fusible material 14 is melted, and the member 13 inserted, the flange 30 being pressed tightly against the resilient ring gasket 19 so as to keep the latter under compression until the material 14 freezes. The member 13 is then firmly fixed in the desired position, and the material 14 is sealed against sublimation.

Between the lower end of the resilient member 24 and the housing 21 is secured the chain support 22, the latter extending downwardly below the housing 21. One end of the flexible flat link chain 17 is fastened, by means of the rivet 20 to the extended portion of the chain support 22, being so arranged with respect to the support 22 that, whenever freely suspended therefrom, the chain assumes the same position. The chain 17 extends first downwardly from the support 22, and thence inwardly and upwardly to its other end, the latter being rigidly secured to the lowermost portion of the semaphore 15 by means of the rivet 18, and the semaphore 15 is secured at its uppermost end to the lower end of the movable member 13 by means of the screw 16.

With the arrangement shown in Fig. 1, it will will be apparent that heat may be conducted from the liquid 11 through the wall 10 of the tank and thence through the wall of the inverted cup 12 to the normally frozen material 14. The temperature of the latter is thus dependent upon the temperature of the tank wall 10, the difference therebetween depending largely upon the rate of change of temperature of the tank wall. Assuming sufficient heat is transmitted to the fusible material 14 to effect melting of the layer of crystals which have theretofore frictionally engaged the inner surface of the cup-shaped member 12, the member 13 moves downwardly away along with the unmelted material clinging thereto, since the latter material, being a relatively poor heat conductor, offers substantial resistance to the transfer of heat through the material to the member 13.

Following the downward movement of the member 13, the indicator, which includes the member 13, the semaphore 15 and the folded portion of the chain 17, assumes the position indicated by the dashed lines of Fig. 1. To make possible easy recognition of the indicating position, the side 28 of the semaphore, as shown in Fig. 3, is preferably the same color as that of the tank-wall background, while the side 29 is of a contrasting color. It will be observed that in the normal position, illustrated by Figs. 1 and 3, the side 28 of the semaphore is faced outwardly from the tank wall 10. Upon release of the movable member 13, the semaphore is rotated, in falling, through an arc of 180 degrees, so that in the indicating position the opposite side faces outwardly, as illustrated in Fig. 4. This action results from the use of a flat linked chain which is so attached to the chain support 22 that the chain has a stable position in which the widest portions of the chain are parallel to the plane of the semaphore when the chain is freely suspended from its upper end. This arrangement also holds the semaphore after rotation in the desired position with the side 29 faced outwardly with respect to the tank wall 10.

Since the fusible material 14 which is interposed between the member 13 and the tank wall 10 has relatively high heat-insulating quality, the member 13 may be of metal, if desired, in which case the arrangement is such that the material 14 both normally insulates and fastens the movable member 13 in the normal position.

It may be mentioned that the device described herein is intended only to indicate tank temperatures within a band, to avoid the relatively costly electric measurements now made in common practice of transformer loading on transformers not operating within that band of temperatures which is conducive to uneconomically short life. In practice, any transformer the tank of which is not so heated as to cause operation of my indicator requires no further measurements, and it is intended that suitable investigation will be made with respect to any transformer the tank of which is so heated, and appropriate alterations effected.

While I have shown and described a specific embodiment of my invention, it will be apparent that changes and modifications may be made therein without departing from the spirit and scope of the invention, and I desire that my invention be limited only as is necessitated by the prior art and the accompanying claims.

I claim as my invention:

1. A thermally responsive device for indicating when the wall of a container has attained a predetermined temperature, comprising at least two separable metal members, one of said members being formed as an inverted cup, means supporting said cup in inverted position in heat-conducting relationship with the wall of said container, the hollow of said cup being uniformly tapered from its open end from one diameter to a relatively smaller diameter and the other of said members extending upwardly into the cup-shaped member in spaced nested relationship and terminating adjacent the closed and smaller diameter interior end of the cup-shaped member, a wall of fusible frozen crystalline material of relatively low heat conductivity filling the space between the nested members and cooperating therewith to mechanically join said members only through frictional engagement therewith, a semaphore rigidly secured to and extending downwardly from the lower end of the other of said members to a first substantially vertically extending position, and means responsive to the fusing of said frozen material for rotating said semaphore through an arc of 180 degrees from said first position to a second substantially vertically extending position and for holding said semaphore in the rotated position following said rotation.

2. A thermally responsive device for indicating when the wall of a container has attained a predetermined temperature comprising at least two separable metal members, one of said members being formed as an inverted cup, means supporting said cup in inverted position in heat-conducting relationship with the wall of said container the hollow of said cup being uniformly tapered from its open end from one diameter to a relatively smaller diameter, and the other of said members extending upwardly into the cup-shaped member in spaced nested relationship and terminating adjacent the upper and closed end of the cup-shaped member, a wall of fusible frozen crystalline material of relatively low heat conductivity filling the space between the nested members and cooperating therewith to mechanically join said members only through frictional engagement therewith, a semaphore rigidly secured to and extending downwardly from the lower end of the other of said members to a first substantially vertically extending position, and means responsive upon the fusing of said frozen material for rotating said semaphore through an arc of 180 degrees from said first position to a second substantially vertically extending position and for holding said semaphore in the rotated position following said rotation, said last-named means including a flexible chain which assumes a predetermined position when suspended from its upper end, means supporting said chain at its upper end, and means fastening said chain to said semaphore at the lower end of the latter.

3. A thermally responsive device for indicating when the wall of a container has attained a predetermined temperature comprising at least two separable metal members, one of said members being formed as a cup, means supporting said cup in inverted position in heat-conducting relationship with the wall of said container and the other of said members extending upwardly into the cup-shaped member in spaced nested relationship and terminating adjacent the upper and closed end of the cup-shaped member, a wall of frozen fusible material filling the space between the nested members and cooperating therewith to mechanically join said members and thereby restrain downward movement of the other of said members under the influence of gravity, a semaphore rigidly secured to and extending downwardly from the lower end of the other of said members to a first substantially vertically extending position and means responsive to the fusing of said frozen material for attendant release of said semaphore for movement downwardly to concurrently rotate said semaphore through an arc of 180 degrees from said first position to a second substantially vertically extending position and to hold said semaphore in the rotated position following said rotation, said last-named means including a flexible chain, means supporting said chain at its upper end, and means fastening the other end of said chain to said semaphore at the lower end of the latter, said chain being so constructed that the links thereof cooperate to restrain movement about its longitudinal axis when supported from its upper end.

RALPH R. PITTMAN.